United States Patent
Date et al.

(10) Patent No.: US 7,197,302 B2
(45) Date of Patent: Mar. 27, 2007

(54) SYSTEM AND METHOD FOR INTERCHANGEABLE MODULAR HARDWARE COMPONENTS FOR WIRELESS COMMUNICATION DEVICES

(75) Inventors: Umesh M. Date, Bangalore (IN); Mehul B. Patel, Bangalore (IN); Gowri S. Rajaram, Oceanside, CA (US)

(73) Assignee: Kyocera Wireless Corp., San Diego ( * ) Notice: Subject to any disclaimer, the term of this patent is extended or adjusted under 35 U.S.C. 154(b) by 191 days.

(21) Appl. No.: 10/848,939

(22) Filed: May 18, 2004

(65) Prior Publication Data

US 2004/0214559 A1   Oct. 28, 2004

Related U.S. Application Data

(63) Continuation-in-part of application No. 10/665,962, filed on Sep. 18, 2003, which is a continuation-in-part of application No. 09/917,026, filed on Jul. 26, 2001, and a continuation-in-part of application No. 09/916,900, filed on Jul. 26, 2001, and a continuation-in-part of application No. 09/916,460, filed on Jul. 26, 2001.

(51) Int. Cl.
*H04M 3/00* (2006.01)

(52) U.S. Cl. .................. 455/419; 455/418; 709/321

(58) Field of Classification Search ............... 455/418, 455/419, 420; 709/321, 203, 208; 717/138; 713/168, 300; 715/765; 711/170–172
See application file for complete search history.

(56) References Cited

U.S. PATENT DOCUMENTS

| | | | |
|---|---|---|---|
| 5,046,082 A | 9/1991 | Zicker et al. | |
| 5,337,255 A | 8/1994 | Seidel et al. | |
| 5,400,389 A | 3/1995 | Niiyama et al. | |
| 5,481,706 A | 1/1996 | Peek | |
| 5,507,009 A | 4/1996 | Grube et al. | |
| 5,600,823 A | 2/1997 | Sherer et al. | |
| 5,673,317 A | 9/1997 | Cooper | |
| 5,699,275 A | 12/1997 | Beasley et al. | |
| 5,715,462 A | 2/1998 | Iwamoto et al. | |

(Continued)

FOREIGN PATENT DOCUMENTS

DE   19502728   8/1996

(Continued)

OTHER PUBLICATIONS

Guiagoussou et al., "Implementation of a Diagnostic and Troubleshooting Multi-Agent System for Cellular Networks", Int'l J Network Mgmnt., pp. 221-237, Aug. 1999.

*Primary Examiner*—Joseph Feild
*Assistant Examiner*—Phuoc Doan

(57) ABSTRACT

Systems and methods for interchangeable hardware components on a wireless communication device are provided. When a handset is powered up after having a hardware component replaced, the handset recognizes the presence of a new component. The handset then queries the component to obtain profile information about the component. The handset next queries an update server over a wireless communication network and requests an optimized device driver that will allow the handset to utilize the complete functionality of the new component. The update server responds with the executable device driver itself and an instruction set for installing the device driver. Upon receipt, the handset installs the device driver and reconfigures or reboots to complete the installation and configuration process.

20 Claims, 4 Drawing Sheets

U.S. PATENT DOCUMENTS

| | | | |
|---|---|---|---|
| 5,734,904 A | 3/1998 | Kanamori et al. | |
| 5,771,386 A | 6/1998 | Baumbauer | |
| 5,784,537 A | 7/1998 | Suzuki et al. | |
| 5,790,704 A | 8/1998 | Rao et al. | |
| 5,790,856 A | 8/1998 | Lillich | |
| 5,832,086 A | 11/1998 | Rosauer | |
| 5,835,778 A | 11/1998 | Yoshihara | |
| 5,875,242 A | 2/1999 | Glaser et al. | |
| 5,920,826 A | 7/1999 | Metso et al. | |
| 5,930,704 A | 7/1999 | Kay | |
| 5,938,766 A | 8/1999 | Anderson et al. | |
| 5,960,356 A | 9/1999 | Alperovich et al. | |
| 5,974,312 A | 10/1999 | Hayes et al. | |
| 6,018,543 A | 1/2000 | Blois et al. | |
| 6,023,620 A | 2/2000 | Hansson | |
| 6,026,400 A | 2/2000 | Suzuki | |
| 6,047,071 A | 4/2000 | Shah | |
| 6,138,009 A | 10/2000 | Birgerson | |
| 6,138,153 A | 10/2000 | Collins, III et al. | |
| 6,145,098 A | 11/2000 | Nouri et al. | |
| 6,195,546 B1 | 2/2001 | Leung et al. | |
| 6,247,065 B1 | 6/2001 | Greenspan et al. | |
| 6,272,333 B1 | 8/2001 | Smith | |
| 6,275,694 B1 | 8/2001 | Yoshida et al. | |
| 6,308,061 B1 | 10/2001 | Criss et al. | |
| 6,351,636 B2 | 2/2002 | Shaffer et al. | |
| 6,415,266 B1 | 7/2002 | Do | |
| 6,442,660 B1 | 8/2002 | Heneriau et al. | |
| 6,449,476 B1 | 9/2002 | Hutchison, IV et al. | |
| 6,457,174 B1 | 9/2002 | Kuroda et al. | |
| 6,460,070 B1 | 10/2002 | Turek et al. | |
| 6,470,447 B1 | 10/2002 | Lambert et al. | |
| 6,493,549 B1 | 12/2002 | Axelson et al. | |
| 6,493,871 B1 | 12/2002 | McGuire et al. | |
| 6,498,789 B1 | 12/2002 | Honda | |
| 6,546,492 B1 | 4/2003 | Walker et al. | |
| 6,549,770 B1 | 4/2003 | Marran | |
| 6,578,056 B1 | 6/2003 | Lamburt | |
| 6,578,142 B1 | 6/2003 | Anderson et al. | |
| 6,622,017 B1 | 9/2003 | Hoffman | |
| 6,633,759 B1 | 10/2003 | Kobayashi | |
| 6,643,506 B1 | 11/2003 | Criss et al. | |
| 6,714,992 B1 | 3/2004 | Kanojia et al. | |
| 6,731,946 B1 | 5/2004 | Stanwood et al. | |
| 6,754,894 B1 | 6/2004 | Costello et al. | |
| 6,754,895 B1 | 6/2004 | Bartel et al. | |
| 6,763,252 B2 | 7/2004 | Itazawa | |
| 6,785,541 B2 | 8/2004 | Martin | |
| 6,950,847 B2 | 9/2005 | Harrisville-Wolff et al. | |
| 6,959,192 B1 | 10/2005 | Cannon et al. | |
| 6,990,660 B2 | 1/2006 | Moshir et al. | |
| 7,065,347 B1 | 6/2006 | Vikse et al. | |
| 2001/0000538 A1 | 4/2001 | Kowaguchi | |
| 2001/0005861 A1 | 6/2001 | Mousseau et al. | |
| 2001/0019953 A1 | 9/2001 | Furukawa et al. | |
| 2001/0027500 A1 | 10/2001 | Matsunaga | |
| 2001/0051519 A1 | 12/2001 | Shirai | |
| 2001/0054161 A1 | 12/2001 | Woodruff | |
| 2002/0019973 A1 | 2/2002 | Hayashida | |
| 2002/0026634 A1 | 2/2002 | Shaw | |
| 2002/0065041 A1 | 5/2002 | Lunsford et al. | |
| 2002/0072359 A1 | 6/2002 | Moles et al. | |
| 2002/0077077 A1 | 6/2002 | Rezvani et al. | |
| 2002/0083142 A1 | 6/2002 | Lagosanto et al. | |
| 2002/0083143 A1* | 6/2002 | Cheng | 709/208 |
| 2002/0131397 A1 | 9/2002 | Patel et al. | |
| 2002/0142762 A1 | 10/2002 | Chmaytalli et al. | |
| 2002/0152268 A1* | 10/2002 | Kureshy et al. | 709/203 |
| 2002/0160763 A1 | 10/2002 | Mittal et al. | |
| 2002/0161796 A1 | 10/2002 | Sylthe | |
| 2002/0170039 A1* | 11/2002 | Kovacevic | 717/138 |
| 2003/0014561 A1* | 1/2003 | Cooper | 709/321 |
| 2003/0060189 A1 | 3/2003 | Minear et al. | |
| 2003/0195013 A1 | 10/2003 | Zicker et al. | |
| 2004/0158829 A1 | 8/2004 | Berestein et al. | |
| 2004/0177072 A1 | 9/2004 | Salminen et al. | |
| 2004/0203768 A1 | 10/2004 | Yiltalo et al. | |
| 2004/0214551 A1 | 10/2004 | Kim | |
| 2004/0229644 A1 | 11/2004 | Hele et al. | |
| 2004/0240657 A1 | 12/2004 | Carmillo et al. | |
| 2004/0249657 A1 | 12/2004 | Kol et al. | |
| 2004/0249768 A1 | 12/2004 | Kontio et al. | |
| 2004/0266422 A1 | 12/2004 | Hotze et al. | |
| 2005/0064847 A1 | 3/2005 | Kirbas et al. | |
| 2005/0079863 A1 | 4/2005 | Macaluso | |
| 2005/0209930 A1 | 9/2005 | Coppinger et al. | |

FOREIGN PATENT DOCUMENTS

| | | |
|---|---|---|
| DE | 19543843 | 5/1997 |
| DE | 19850133 | 5/1999 |
| EP | 0459344 | 12/1991 |
| EP | 0889405 | 1/1999 |
| EP | 0918420 | 5/1999 |
| EP | 1014263 | 6/2000 |
| FR | 2800963 | 5/2001 |
| GB | 2227584 | 8/1990 |
| GB | 2349485 | 11/2000 |
| WO | WO 9300633 | 1/1993 |
| WO | WO 98/09208 | 3/1998 |
| WO | WO 9922325 | 5/1999 |
| WO | WO 00/67112 | 9/2000 |
| WO | WO 0073912 | 12/2000 |
| WO | WO 0074412 | 12/2000 |
| WO | WO 0135686 | 5/2001 |
| WO | WO 02058364 | 7/2002 |

* cited by examiner

US 7,197,302 B2

SYSTEM AND METHOD FOR INTERCHANGEABLE MODULAR HARDWARE COMPONENTS FOR WIRELESS COMMUNICATION DEVICES

RELATED APPLICATIONS

This application is a continuation in part application of U.S. patent application Ser. No. 10/665,962, filed on Sep. 18, 2003, which is a continuation in part of U.S. patent application Ser. No. 09/917,026, filed on Jul. 26, 2001, of U.S. patent application Ser. No. 09/916,900, filed on Jul. 26, 2001, and of U.S. patent application Ser. No. 09/916,460, filed on Jul. 26, 2001, which are hereby incorporated by reference.

This application is also related to U.S. application Ser. No. unknown entitled "Modular Software Components for Wireless Communication Devices" and to U.S. application Ser. No. unknown entitled "Dynamic Interface Software for Wireless Communication Devices", which are filed concurrently herewith. Additionally, this application is related to U.S. application Ser. No. 09/927,131, filed on Aug. 10, 2001; to U.S. application Ser. No. 09/969,305, filed on Oct. 2, 2001; to U.S. application Ser. No. 09/970,188, filed on Oct. 3, 2001; to U.S. application Ser. No. 09/972,519, filed on Oct. 5, 2001; to U.S. application Ser. No. 10/206,780, filed on Jul. 25, 2002; to U.S. application Ser. No. 10/206,781, filed on Jul. 25, 2002; and to U.S. application Ser. No. 10/206,516, filed on Jul. 25, 2002, which are hereby incorporated by reference.

FIELD OF THE INVENTION

The present invention generally relates to the field of wireless communications and more particularly relates to interchangeable hardware components for a wireless communication device.

BACKGROUND OF THE INVENTION

Conventional wireless communication devices typically become isolated computing platforms once they are deployed (i.e., sold to a consumer). Consumers typically must bring the wireless communication device (also referred to herein as "wireless device," "handset," and "mobile device") to a service station for upgrades to the operating system or any integral software application such as a phonebook.

Additionally, if the consumer wants to replace a hardware component of a wireless communication device, the wireless device must be brought into a service station. Generally, hardware replacements are prohibitively expensive if the wireless device is not broken and under warranty. Even so, when a wireless device under warranty has a hardware component replaced, the new component is merely a working version of the component being replaced. Thus, when a consumer purchases a wireless communication device, the consumer is locked into the physical configuration of the wireless device for the life of the wireless communication device.

An additional drawback of conventional wireless communication devices is that new external devices, such as digital cameras, are limited to the specific, proprietary device that is offered by the manufacturer of the handset. Thus, a consumer's choice of external devices that enhance a wireless communication device is severely limited. Therefore, what is needed is a system and method that overcomes these significant problems found in the conventional systems as described above.

SUMMARY OF THE INVENTION

Conventional wireless communication devices are isolated computing platforms. For a user of a wireless communication device to take advantage of advances in technology embodied in the physical device, a new device must be purchased. If a new model with an improved display is released by the manufacturer, the user has no way to upgrade the handset. Additionally, if a hardware component malfunctions or breaks. The entire handset requires replacement, or in some instances the handset can be sent back to the manufacturer where it is refurbished. Unfortunately, this refurbishing doesn't allow for upgraded, newer components to be used. The manufacturer must replace the component with a working version of the same component.

The present invention provides systems and methods for interchangeable modular hardware components on a wireless communication device. When a handset component is obsolete or a new and improved component is available, the new component can be swapped with the old component. When the handset is powered up after having a hardware component replaced, the handset recognizes that a new component is present. Upon recognizing the new component, the handset queries the component to obtain information about the components characteristics. Once this information has been obtained, the handset queries an update server over a wireless communication network for an optimized device driver that will allow the handset to utilize the improved functionality of the new component. Additionally, the handset may query the update server for new software applications that also exploit the improved functionality of the new component. The update server responds with an instruction set for installing the device driver and the device driver itself. Upon receipt, the handset installs the device driver and reconfigures or reboots to complete the installation and configuration.

BRIEF DESCRIPTION OF THE DRAWINGS

The details of the present invention, both as to its structure and operation, may be gleaned in part by study of the accompanying drawings described below, in which like reference numerals refer to like parts.

DETAILED DESCRIPTION

Certain embodiments as disclosed herein provide for a wireless communication device and method for dynamically recognizing and interfacing with an external device. For example, one method as disclosed herein allows for a wireless communication device to recognize the presence of an external device via a wired or wireless communication link. Upon recognition, the wireless communication device queries the external device to obtain summary profile information about the device. The wireless communication device then queries a server over a wireless communication network and receives a response comprising an interface to facilitate communication between the devices.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1:
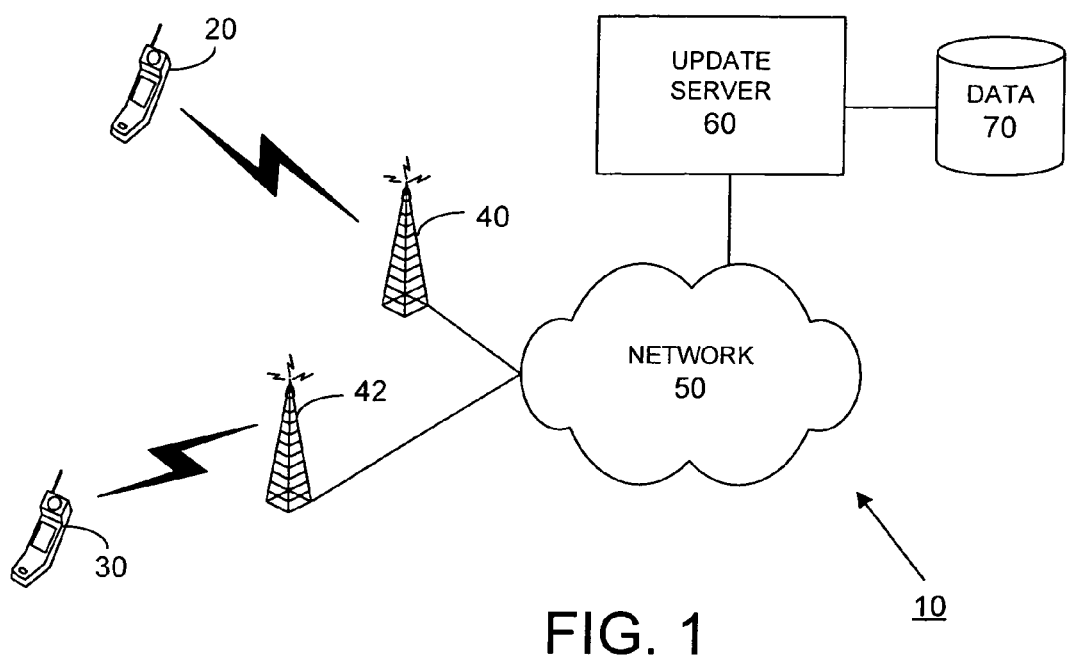
FIG. 1 is a high level block diagram illustrating an example wireless communication network.

FIG. 1 is a high level block diagram illustrating an example wireless communication network 10. In the illustrated embodiment, the wireless communication network 10 comprises a plurality of wireless communication devices 20 and 30 communicatively coupled with a network 50 via a plurality of base stations 40 and 42. Additional wireless communication devices and base stations can also be employed as part of the wireless communication network 10. The wireless communication network 10 also comprises an update server 60, which is coupled with a data storage area 70. The wireless communication devices 20 and 30 are communicatively coupled with the update server 60 via the base stations 40 and 42 and the network 50.

Wireless communication device 20 can be any sort of device with the ability to communicate within the wireless communication network 10 and have modular hardware components replaced. Preferably, wireless communication device 20 also has a persistent storage area. For example, wireless communication device 20 may be a cell phone, a personal digital assistant ("PDA"), a laptop computer, wristwatch, or any other device configured for wireless communication. Wireless communication devices may also be referred to herein as "handsets" or "mobile phones" or "mobile devices."

Base station 40 is preferably configured to communicate over-the-air with a plurality of wireless communication devices and includes a transceiver (not shown) that converts the over-the-air communications to wired communications that travel over network 50. Preferably, network 50 is a private network operated by a wireless carrier. Network 50 preferably provides the infrastructure for handoffs between base stations such as base station 40 and 42. Additionally, network 50 preferably provides the communication link between various applications, services, and other computer based servers such as update server 60.

Network 50 may also serve as the conduit for connections to other networks (not pictured) such as an Integrated Services Digital Network ("ISDN"), Public Switched Telephone Network ("PSTN"), Public Land Mobile Network ("PLMN"), Packet Switched Public Data Network ("PSPDN"), and the Internet, just to name a few.

Update server 60 can be implemented as a single computer or as a plurality of servers logically arranged to provide dynamic instruction sets and device drivers to mobile devices and to execute dynamic instruction sets received from mobile devices. In the illustrated embodiment, update server 60 is coupled with a data storage area 70 that preferably houses a plurality of executable interfaces and a set of server operation codes, handset operation codes and executable instructions corresponding to the server operation codes. The features of a general purpose computer that may implement the update server 60 are later described with respect to FIG. 9.

The function of the update server 60 is preferably to receive requests from a handset and respond to those requests by providing the handset with an executable device driver that the handset can use to communicate with a new hardware module installed in the handset.

Figure 2:
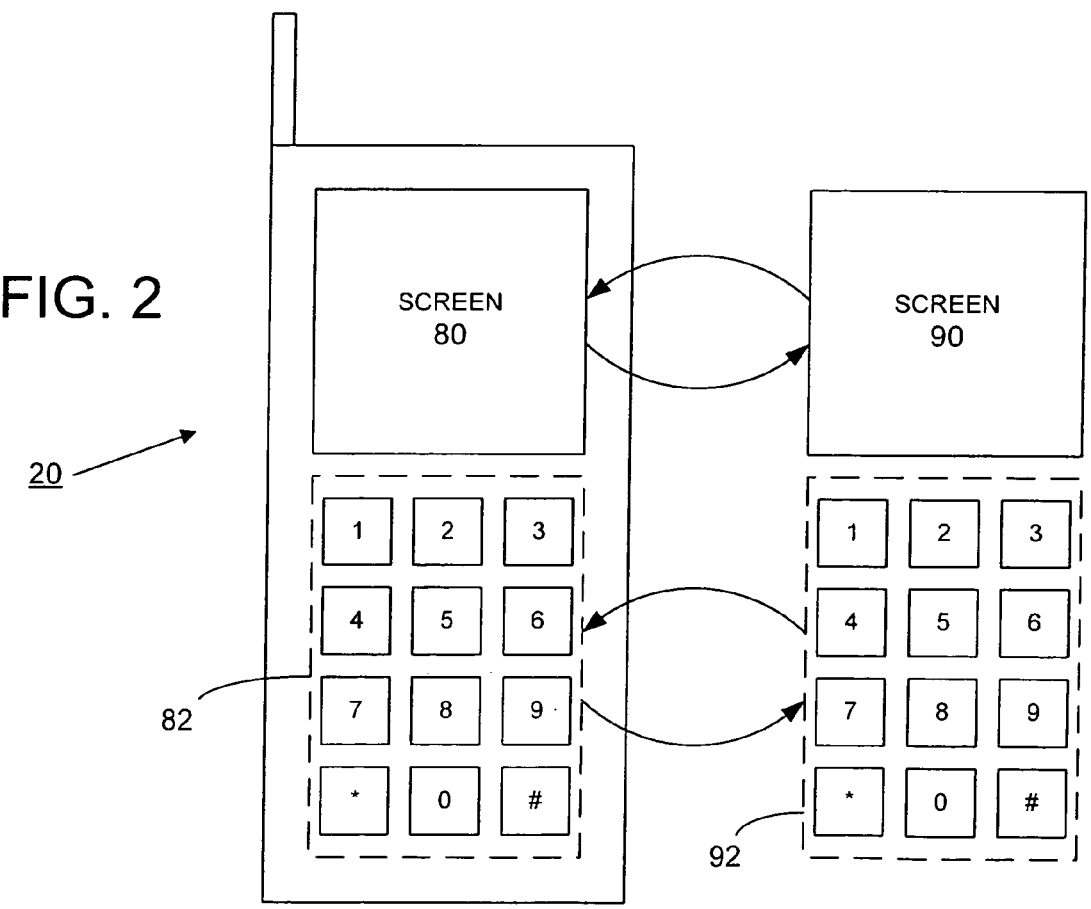
FIG. 2 is a block diagram illustrating an example wireless communication device and modular hardware components.

FIG. 2 is a block diagram illustrating an example wireless communication device 20 and modular hardware components. In the illustrated embodiment, the handset 20 comprises a plurality of hardware modules including a screen 80 and a keypad 82. Additional hardware modules are also typically included in handset such as handset 20 and may include a radio chipset, for example. A hardware module is a component of the handset 20 that is capable of electrical communication within the handset. Inert components with no communication ability such as the casing are not considered to be hardware modules.

In the illustrated embodiment, the display screen 80 is interchangeable with a new display screen 90. For example, the screen 80 may be limited to displaying monochrome while the screen 90 may be capable of displaying color. Similarly, the keypad 82 is interchangeable with a new keypad 92. For example, the new keypad 92 have the ability to illuminate the keys while the keypad 82 may not have this ability.

Figure 3A:
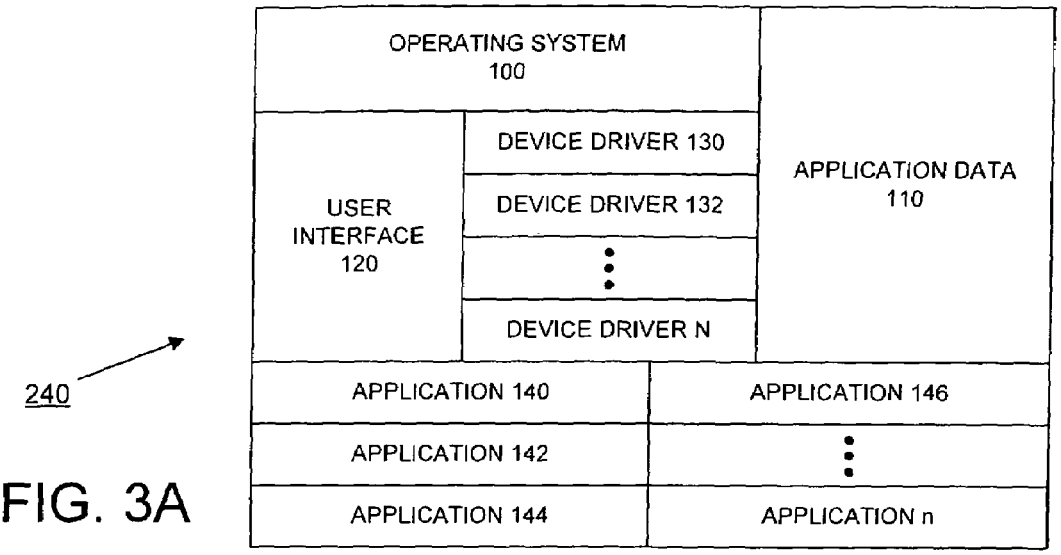
FIG. 3A is a block diagram illustrating an example representation of data in persistent storage on a wireless communication device.

FIG. 3A is a block diagram illustrating an example representation of data in persistent storage 240 on a wireless communication device 20. The general features of wireless communication device 20, 30 that allow it to function as such are later described with respect to FIG. 8. In the illustrated embodiment, the operating system 100 is resident in persistent storage 240. The operating system 100 preferably comprises the fundamental executable program or programs that allow the device to function. In addition to the operating system 100, application data 110 and user interface 120 are in persistent storage 240. The application data 110 preferably comprises the user information and application information that an application needs to function or that an application uses to provide its service.

The user interface 120 may comprise both the executable user interface application and the user interface data that is used by the application. In an alternative embodiment, the user interface application portion may be included as part of the operating system and the user interface 120 may comprise ancillary user data or custom data or other data usable by the user interface application or the user. The persistent storage area 240 additionally comprises one or more device drivers such as device driver 130, device driver 132, all the way up to device driver n. These device drivers are preferably executable applications that facilitate communication between the handset and another device, or possibly between the core handset and an integral device such as the display, keypad, speaker, microphone, or earphones, just to name a few.

Additionally shown as part of the persistent storage 240 are a series of software applications or modules such as applications 140, 142, 144, 146, and on up to application n. As illustrated, a large number of applications may be resident as part of the persistent storage 240. The only limit on the number of applications that can be stored in persistent storage 240 is the physical limit of the storage 240.

Figure 3B:
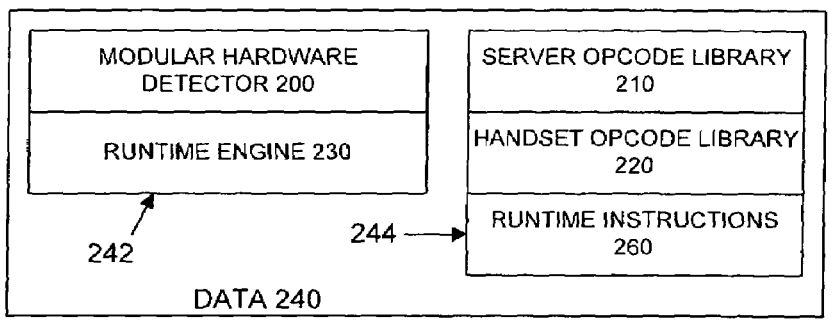
FIG. 3B is a block diagram illustrating components of a data storage area in an example embodiment.

FIG. 3B is a block diagram illustrating elements of data 240 of an example wireless communication device 20. In the illustrated embodiment, the data 240 has a number of applications 242 comprising a modular hardware detector 200 and a runtime engine 230. Other data elements 244, which may be included in the application data 110 as illustrated in FIG. 3A, comprise a server operation code ("opcode") library 210, handset opcode library 220, and runtime instructions 260.

The modular hardware detector 200 is preferably configured to determine when a new hardware module has been exchanged with a previous hardware module. In one embodiment, the modular hardware detector 200 function upon power up to detect the presence of a new hardware module. Alternatively, the modular hardware detector 200 may operate during the power on mode to detect any new hardware that was "hot" swapped, or otherwise replaced while the handset 20 was powered on. The modular hardware detector 200 can be implemented as a combination of electromechanical and software components to carry out the detection function and is preferably in communication with the runtime engine 230 to inform the runtime engine of newly detected hardware modules.

Additionally, the modular hardware detector 200 can be configured to determine the available space in persistent storage 240 where a new device driver is to be installed. For example, upon detecting a new hardware module, the modular hardware detector 200 preferably determines the amount of storage space used for the current device driver, e.g., device driver N illustrated in FIG. 3A, and the amount of storage space needed for the new device driver. In one embodiment, to determine the storage space used for the current device driver, the modular hardware detector 200 may query the operating system 100. Additionally, to determine the amount of storage space needed for the new device driver, the modular hardware detector 200 may query the update server 60, illustrated in FIG. 1, through the runtime engine 230 to obtain that information.

If the current device driver and the new device driver are the same size or if the new device driver requires less storage space than the current device driver, then the new device driver can be installed in the same place in persistent storage where the current device driver is located. If the new device driver requires more storage space than the current driver, then the modular hardware detector 200 preferably can install the new device driver in another portion of the persistent storage area 240 that is newly allocated for device driver storage by the modular hardware detector 200. Alternatively, the modular hardware detector 200 may also query the user to identify data in persistent storage that can be deleted to make room for the new device driver.

The modular hardware detector 200 is preferably configured to instruct the operating system 100 to delete the current device driver after installation of the new device driver is successful. Preferably, the current device driver is backed up in persistent or volatile storage during the installation process for the new device driver.

The handset opcode library 220 preferably includes the universe of operation codes that represent each function or executable code segment that the handset can be instructed to execute by the update server 60. Advantageously, handset opcode library 220 includes the operation codes that serve as place holders for the actual executable machine code functions or code segments. As such, the handset opcode library 220 preferably contains a list of all available operation codes that correspond to each and every function that can be executed by the handset 20.

Similarly, the server opcode library 210 preferably includes the universe of operation codes that represent each server side function or executable code segment. Advantageously, server opcode library 210 may only include the operation codes for the actual executable machine code functions or code segments, which do not reside on the wireless communication device 20. As such, the server opcode library 220 contains a list of all the operation codes for each available server function that can be executed by the update server 60 on behalf of the handset 20. In the preferred embodiment, the number of available server functions can well exceed the number of available handset functions because the update server 60 does not suffer from the minimal resources typically found on mobile devices such as, for example, cell phones and PDAs.

Runtime engine 230 is preferably configured to process dynamic instructions sets. One example of a dynamic instruction set is a set of instructions to install a device driver for a new hardware component. The processing of dynamic instruction sets includes translation of opcodes into executable instruction sets and execution of those instruction sets. For example, a set of handset opcodes may be received from the update server 60 along with a data payload. The opcodes are then translated into executable instructions for the handset. The processing of dynamic instruction sets also includes compilation of opcodes and corresponding data payloads for delivery to the update server 60. Preferably, runtime engine 230 can be launched by wireless communication device 20 on an as needed basis so that it runs only when necessary and consumes a minimal amount of system resources (e.g. memory, CPU cycles, etc.) on the handset 20.

Figure 3C:
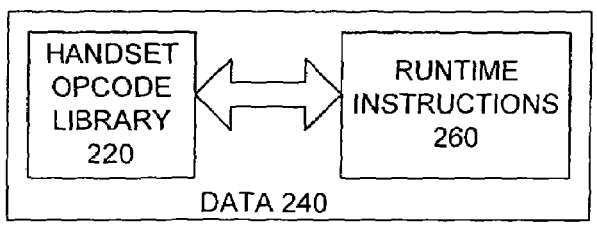
FIG. 3C is a block diagram illustrating an example operation code library and corresponding runtime instruction set.

FIG. 3C is a block diagram illustrating an example operation code library and corresponding runtime instruction set 260. The handset opcode library 220 and runtime instruction set 260 are preferably housed in the data storage area 240 in the handset 20, 30. In one embodiment, the executable instructions in the runtime instruction set 260 correspond in a one-to-one relationship with the opcodes contained in the handset opcode library 220. Alternatively, a single opcode in the handset opcode library 220 may correspond to a sequence of many executable instructions in the runtime instructions 260.

Figure 3D:
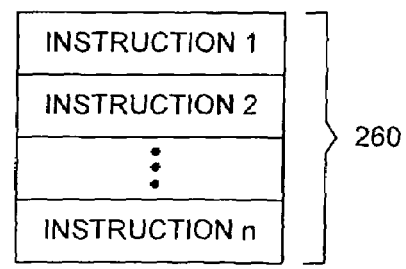
FIG. 3D is a block diagram illustrating an example set of runtime instructions.

FIG. 3D is a block diagram illustrating an example set of runtime instructions 260. In the illustrated embodiment, any number of executable instructions can be included in runtime instructions 260, from instruction 1 through instruction n. Optimally, a large number of functions are available in runtime instructions 260 and yet consume very little resources (e.g. persistent memory) of the handset 20, 30.

Figure 4:
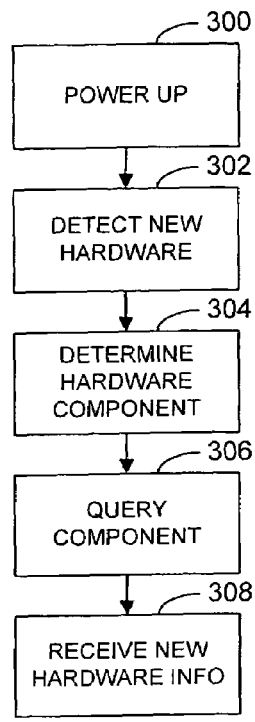
FIG. 4 is a flow diagram illustrating an example process for obtaining summary information from a new hardware component on a wireless communication device.

FIG. 4 is a flow diagram illustrating an example process for obtaining summary information from a new hardware component. Initially, in step 300, the handset powers up. Preferably, upon power up the handset investigates its various hardware components, for example, by communicating with each component to determine its status. Alternatively, if the handset is already operational, the handset may, on its own initiative (e.g., due to a pre-scheduled event) or by way of an external instruction (e.g., received from a network or user), initiate the same investigation process to determine the status of the various hardware components.

Next, in step 302 the handset detects a new hardware component. The new component does not need to be a new functional component, but can be a replacement of a previous hardware module, e.g., a new display screen. Upon detecting a new hardware component, the handset next determines in step 304 the type of component it is, for example, screen, keypad, radio chipset, or the like. The handset then queries the new component in step 306 to obtain information about the new component. This new component information is received by the handset in step 308 and preferably stored in persistent or volatile memory. In one embodiment, the new hardware module information includes an identifier that uniquely identifies the new hardware module.

Figure 5:
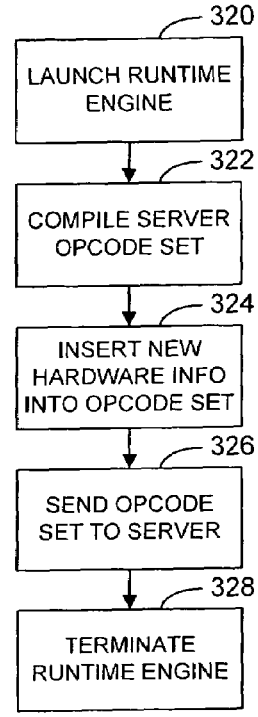
FIG. 5 is a flow diagram illustrating an example process for requesting a device driver for a new hardware component from a remote server.

FIG. 5 is a flow diagram illustrating an example process for requesting a device driver for a new hardware component from a remote server. Initially, in step 320 the runtime engine is launched. Once the runtime engine is running, the engine can compile a set of server opcodes, as shown in step 322. The set of server opcodes may be obtained from a background process running on the wireless device 20, 30. Alternatively, the server opcode set may be obtained from a process running on the wireless device under the direction of a user. The compiled set of server opcodes preferably causes the server to reply with an executable device driver to allow the handset to communicate with and fully utilize the functionality of the new hardware module.

For example, the wireless device detects a new hardware module has been installed. The new hardware module is queried and summary profile information is obtained. A server opcode set is compiled instructing the server to provide the handset with an executable device driver for the new hardware module so that the handset may communicate with the new hardware module. In such as case, the result is a server opcode set generated by the runtime engine, as shown in step 322.

Once the server opcode set has been generated, the runtime engine includes the information for the new hardware module in the data payload that corresponds to the server opcode set. For example, the runtime engine may fetch the hardware module information from persistent or volatile memory, or execute an instruction that returns the data needed. Once the data has been obtained, the runtime engine next inserts the new hardware module information into the server opcode set, as illustrated in step 324. One simple way to achieve this is to append the data payload to the server opcode set in a single data packet.

Once the data payload has been combined with the server opcode set, then the runtime engine sends the server opcode set with the corresponding data payload to the server, as shown in step 326. After the server opcode set and data payload has been sent, the runtime engine may be terminated to free up resources on the wireless device, as illustrated in step 328.

Figure 6:
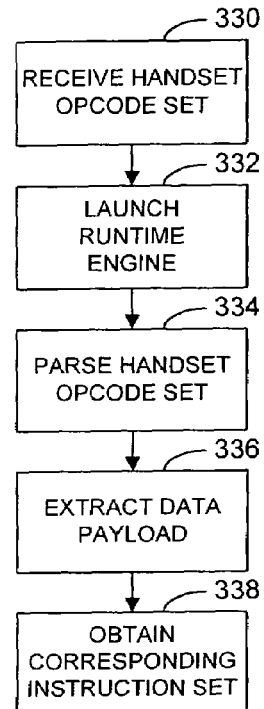
FIG. 6 is a flow diagram illustrating an example process for installing a device driver for a new hardware component on a wireless communication device.

FIG. 6 is a flow diagram illustrating an example process for installing a device driver for a new hardware component on a wireless communication device. Initially, in step 330, the wireless device receives a set of handset opcodes. The set of handset opcodes can be received via an over-the-air communication link, for example a link with a wireless communication network. Preferably, the opcodes are optimized to minimize the amount of data sent over-the-air. Additionally, a data payload can be included with the set of opcodes received by the handset.

In step 332, the wireless device launches its runtime engine to process the handset opcode set. As illustrated in step 334, the runtime engine parses the handset opcode set and then extracts the data payload in step 336. The data payload is preferably stored in an available portion of volatile memory for later use. Next, the runtime engine obtains the executable instructions that correspond to the opcodes in the handset opcode set as shown in step 338. These instructions can be obtained from the remote runtime instructions set stored in persistent storage on the data storage area of the handset.

Once the executable instructions corresponding to the opcodes in the handset opcode set have been obtained, the runtime engine executes the instructions, as illustrated in step 340. When the instructions are being executed, any necessary data to be operated on can be obtained from volatile memory where the data payload is stored. Alternatively, or additionally, any necessary data to be operated on may be obtained as the result of an executed instruction. Preferably, the execution of the instruction set causes the device driver for the new hardware module to be installed on the handset.

For example, the data payload comprises the device driver needed by the handset to communicate with the new hardware module. Additionally, one or more of the opcodes in the handset opcode set preferably correspond to one or more executable instructions for storing the data payload in persistent memory on the handset. In this example, once the data payload comprising the device driver is stored in persistent memory, the handset may thereafter communicate with the new hardware module using the device driver, which preferably is configured to take full advantage of the functionality of the new hardware module.

Alternatively, the data payload may replace a portion of persistent memory that contains an outdated device driver for the hardware component that was replaced. Thus, the handset opcode set and data payload operate on the wireless device to install a new device driver for the new hardware module. Additional opcodes and instructions may also be employed to configure the new device driver or other aspects of the handset once the new device driver has been installed.

Once the instruction set has been executed in its entirety by the runtime engine, the runtime engine can be terminated, as shown in step 342. Advantageously, the runtime engine may be launched and terminated so that it only runs when necessary. This saves system resources on the wireless device, for example it may save volatile memory space, CPU cycles, and battery life. Once the device driver for the new hardware module has been installed and configured for use, as illustrated in step 346, the handset may begin using the new hardware module in the course of normal operation.

Figure 7:
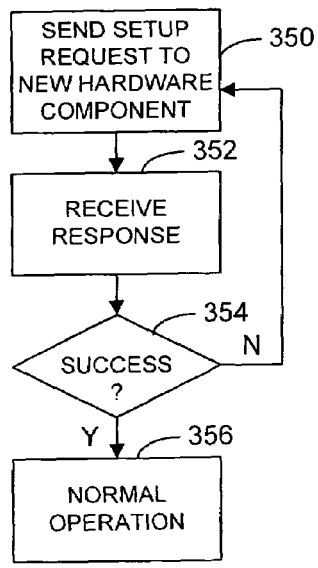
FIG. 7 is flow diagram illustrating an example process for configuring a new hardware component on a wireless communication device.

FIG. 7 is flow diagram illustrating an example process for configuring a new hardware component on a wireless communication device. Initially, in step 350, the handset uses the new device driver to send a setup request to the new hardware module. Next, in step 352, the handset receives a response from the new hardware module. In one embodiment the response may comprise more comprehensive profile information about the hardware module that can be interpreted by the device driver to fine tune the operation of the device. For example, the response may provide the device driver with additional information relating to the hardware component or its communication capabilities such as its interface version or other information to make communication between the device driver and the new hardware module more efficient.

Alternatively, the response may be an indication of an unsuccessful attempt to communicate with the new hardware module, as determined in step 354. If the setup request received a response indicating that the setup was unsuccessful, the handset returns to step 350 and sends another setup request. In one embodiment, the handset may cycle through a predetermined number (e.g., N) of setup requests until a request that is formatted correctly is provided to the new hardware component. For example, the various setup requests may conform to different versions of the interface or different communication modes for the device driver.

There may also be synchronization issues for the device driver and the new hardware module to work through in an iterative process. Accordingly, the particular setup request that receives a successful response may advantageously provide the device driver with important information about the version of the firmware that is installed on the new hardware module, the capabilities of the new hardware module, and other information about the new hardware module. Once a successful response is received from the new hardware module, as determined in step 354, the handset may proceed to use the new hardware module in the course of normal operation as shown in step 356. If no successful response is received in the N setup requests, the old device driver can be restored. Advantageously, backward compatible devices will operate with the old device driver, although new or improved functionality may not be available through the old device driver.

Figure 8:
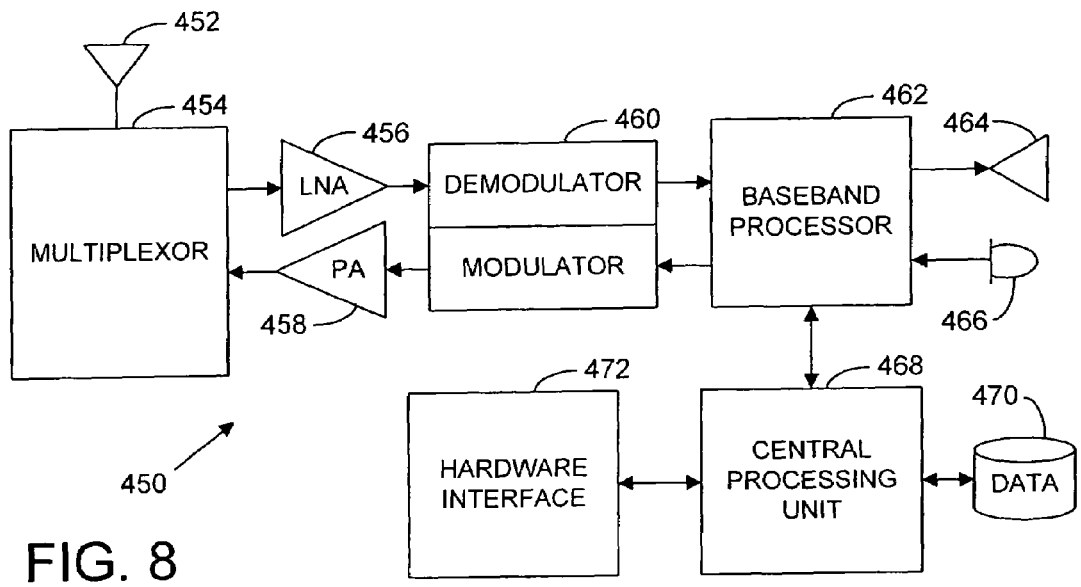
FIG. 8 is a block diagram illustrating an exemplary wireless communication device that may be used in connection with the various embodiments described herein.

FIG. 8 is a block diagram illustrating an exemplary wireless communication device 450 that may be used in connection with the various embodiments described herein. For example, the wireless communication device 450 may be used in conjunction with a handset or PDA network device or as a part of a sensor node in a wireless mesh network. However, other wireless communication devices and/or architectures may also be used, as will be clear to those skilled in the art.

In the illustrated embodiment, wireless communication device 450 comprises an antenna 452, a multiplexor 454, a low noise amplifier ("LNA") 456, a power amplifier ("PA") 458, a modulation circuit 460, a baseband processor 462, a speaker 464, a microphone 466, a central processing unit ("CPU") 468, a data storage area 470, and a hardware interface 472. In the wireless communication device 450, radio frequency ("RF") signals are transmitted and received by antenna 452. Multiplexor 454 acts as a switch, coupling antenna 452 between the transmit and receive signal paths. In the receive path, received RF signals are coupled from a multiplexor 454 to LNA 456. LNA 456 amplifies the received RF signal and couples the amplified signal to a demodulation portion of the modulation circuit 460.

Typically modulation circuit 460 will combine a demodulator and modulator in one integrated circuit ("IC"). The demodulator and modulator can also be separate components. The demodulator strips away the RF carrier signal leaving a base-band receive signal, which is sent from the demodulator output to the base-band processor 462.

If the base-band receive audio signal contains audio information, then base-band processor 462 decodes the signal and converts it to an analog signal. Then the signal is amplified and sent to the speaker 464. The base-band processor 462 also receives analog audio signals from the microphone 466. These analog audio signals are converted to digital signals and encoded by the base-band processor 462. The base-band processor 462 also codes the digital signals for transmission and generates a base-band transmit audio signal that is routed to the modulator portion of modulation circuit 460. The modulator mixes the base-band transmit audio signal with an RF carrier signal generating an RF transmit signal that is routed to the power amplifier 458. The power amplifier 458 amplifies the RF transmit signal and routes it to the multiplexor 454 where the signal is switched to the antenna port for transmission by antenna 452.

The baseband processor 462 is also communicatively coupled with the central processing unit 468. The central processing unit 468 has access to a data storage area 470. The central processing unit 468 is preferably configured to execute instructions (i.e., computer programs or software) that can be stored in the data storage area 470. Computer programs can also be received from the baseband processor 462 and stored in the data storage area 470 or executed upon receipt. Such computer programs, when executed, enable the wireless communication device 450 to perform the various functions of the present invention as previously described.

In this description, the term "computer readable medium" is used to refer to any media used to provide executable instructions (e.g., software and computer programs) to the wireless communication device 450 for execution by the central processing unit 468. Examples of these media include the data storage area 470, microphone 466 (via the baseband processor 462), antenna 452 (also via the baseband processor 462), and hardware interface 472. These computer readable mediums are means for providing executable code, programming instructions, and software to the wireless communication device 450. The executable code, programming instructions, and software, when executed by the central processing unit 468, preferably cause the central processing unit 468 to perform the inventive features and functions previously described herein.

The central processing unit is also preferably configured to receive notifications from the hardware interface 472 when new devices are detected by the hardware interface. Hardware interface 472 can be a combination electromechanical detector with controlling software that communicates with the CPU 468 and interacts with new devices.

Figure 9:
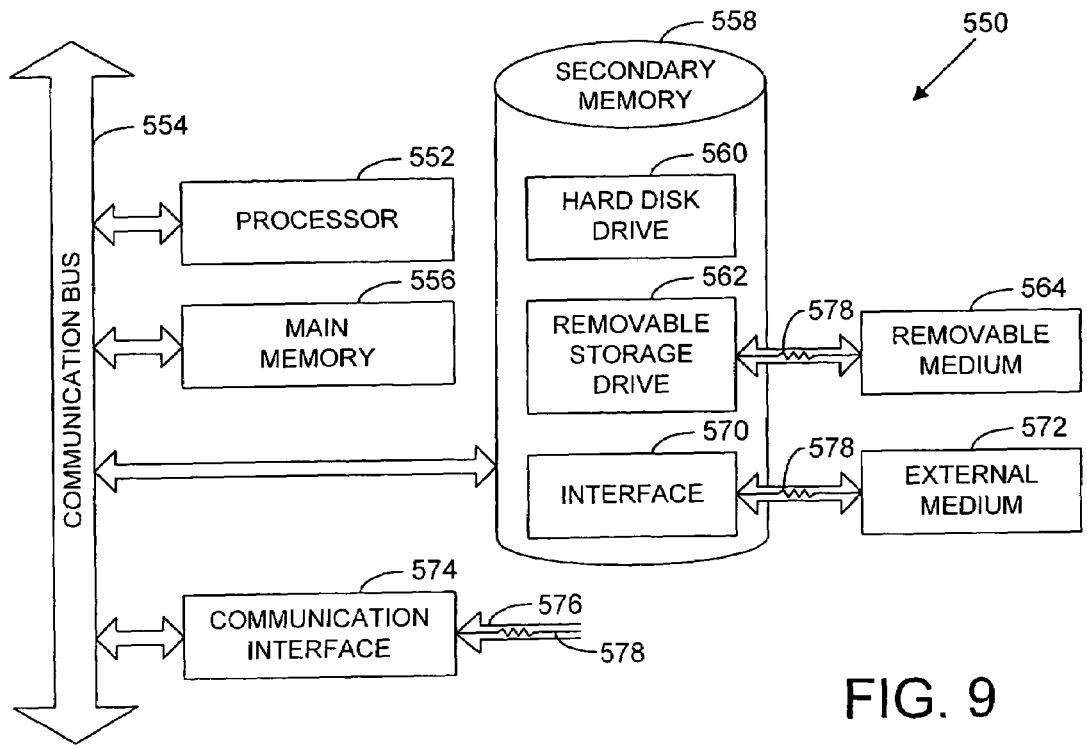
FIG. 9 is a block diagram illustrating an exemplary computer system as may be used in connection with various embodiments described herein.

FIG. 9 is a block diagram illustrating an exemplary computer system 550 that may be used in connection with the various embodiments described herein. For example, the computer system 550 may be used in conjunction with a remote server configured to process server opcode sets and create and send handset opcode sets. However, other computer systems and/or architectures may be used, as will be clear to those skilled in the art.

The computer system 550 preferably includes one or more processors, such as processor 552. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 552.

The processor 552 is preferably connected to a communication bus 554. The communication bus 554 may include a data channel for facilitating information transfer between storage and other peripheral components of the computer system 550. The communication bus 554 further may provide a set of signals used for communication with the processor 552, including a data bus, address bus, and control bus (not shown). The communication bus 554 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 550 preferably includes a main memory 556 and may also include a secondary memory 558. The main memory 556 provides storage of instructions and data for programs executing on the processor 552. The main memory 556 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 558 may optionally include a hard disk drive 560 and/or a removable storage drive 562, for example a floppy disk drive, a magnetic tape drive, a compact disc ("CD") drive, a digital versatile disc ("DVD") drive, etc. The removable storage drive 562 reads from and/or writes to a removable storage medium 564 in a well-known manner. Removable storage medium 564 may be, for example, a floppy disk, magnetic tape, CD, DVD, etc.

The removable storage medium 564 is preferably a computer readable medium having stored thereon computer executable code (i.e., software) and/or data. The computer software or data stored on the removable storage medium 564 is read into the computer system 550 as electrical communication signals 578.

In alternative embodiments, secondary memory 558 may include other similar means for allowing computer programs or other data or instructions to be loaded into the computer system 550. Such means may include, for example, an external storage medium 572 and an interface 570. Examples of external storage medium 572 may include an external hard disk drive or an external optical drive, or and external magneto-optical drive.

Other examples of secondary memory 558 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 572 and interfaces 570, which allow software and data to be transferred from the removable storage unit 572 to the computer system 550.

Computer system 550 may also include a communication interface 574. The communication interface 574 allows software and data to be transferred between computer system 550 and external devices (e.g. printers), networks, or information sources. For example, computer software or executable code may be transferred to computer system 550 from a network server via communication interface 574. Examples of communication interface 574 include a modem, a network interface card ("NIC"), a communications port, a PCMCIA slot and card, an infrared interface, and an IEEE 1394 fire-wire, just to name a few.

Communication interface 574 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 574 are generally in the form of electrical communication signals 578. These signals 578 are preferably provided to communication interface 574 via a communication channel 576. Communication channel 576 carries signals 578 and can be implemented using a variety of communication means including wire or cable, fiber optics, conventional phone line, cellular phone link, radio frequency (RF) link, or infrared link, just to name a few.

Computer executable code (i.e., computer programs or software) is stored in the main memory 556 and/or the secondary memory 558. Computer programs can also be received via communication interface 574 and stored in the main memory 556 and/or the secondary memory 558. Such computer programs, when executed, enable the computer system 550 to perform the various functions of the present invention as previously described.

In this description, the term "computer readable medium" is used to refer to any media used to provide computer executable code (e.g., software and computer programs) to the computer system 550. Examples of these media include main memory 556, secondary memory 558 (including hard disk drive 560, removable storage medium 564, and external storage medium 572), and any peripheral device communicatively coupled with communication interface 574 (including a network information server or other network device). These computer readable mediums are means for providing executable code, programming instructions, and software to the computer system 550.

In an embodiment that is implemented using software, the software may be stored on a computer readable medium and loaded into computer system 550 by way of removable storage drive 562, interface 570, or communication interface 574. In such an embodiment, the software is loaded into the computer system 550 in the form of electrical communication signals 578. The software, when executed by the processor 552, preferably causes the processor 552 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

While the particular systems and methods for modular hardware components for wireless communication devices herein shown and described in detail is fully capable of attaining the above described objects of this invention, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

We claim:

1. A wireless communication device comprising:
a data storage area comprising instructions executable by the wireless communication device and a plurality of device drivers corresponding to a plurality of hardware components;
a modular hardware detector configured to detect a new hardware component connected to the wireless communication device to replace a previous hardware component having a previous device driver of the plurality of device drivers, the modular hardware detector further configured to query the new hardware component to obtain profile information from the new hardware component, the modular hardware detector further configured to obtain a size of the previous device driver and to obtain a size of a new device driver for the new hardware component to determine a need to allocate space in the data storage area for the new device driver;
a runtime engine configured to receive the profile information for the new hardware component from the modular hardware detector and to compile a request for the new device driver for the new hardware component, the request having a data payload comprising at least a portion of the profile information.

2. The system of claim 1, further comprising a server opcode library housed in the data storage area, the server opcode library comprising server operation codes corresponding to instructions executable by a remote server.

3. The system of claim 2, further comprising a handset opcode library housed in the data storage area, the handset opcode library comprising device operation codes corresponding to instructions executable by the wireless communication device.

4. The system of claim 1, wherein the profile information comprises an identifier that uniquely identifies the new hardware component.

5. The system of claim 1, wherein the data storage area is a persistent storage area, the wireless communication device further comprising a volatile storage area for temporarily storing the previous device driver until the new device driver is successfully stored in the data storage area.

6. The system of claim 1, wherein the size of the previous device driver is obtained from at least one of an operating system of the wireless communication device and an update server over a wireless communication network.

7. A method for field replacement of a previous hardware component in a wireless communication device, comprising:
detecting a new hardware component in the wireless communication device, the new hardware component replacing a previous hardware component having a previous device driver;
querying the new hardware component to obtain profile information for the new hardware component;
sending a request to an update server via a wireless communication network, the request comprising at least a portion of the profile information;
receiving a response from the update server via the wireless communication network, wherein the response comprises an executable device driver for the new hardware component and installation instructions;
determining a previous device driver size of the previous device driver;
determining an executable device driver size of the executable device driver;
determining a need to allocate space in a persistent storage of the wireless communication device for the executable device driver based upon a comparison between the previous device driver size and the executable device driver size.

8. The method of claim 7, further comprising the steps of:
installing the executable device driver; and
configuring the new hardware component.

9. The method of claim 7, wherein the profile information comprises an identifier that uniquely identifies the new hardware component.

10. The method of claim 9, wherein the request sent to the update server comprises the identifier.

11. The method of claim 7, wherein the detecting step is initiated by at least one of a power on sequence and a user request.

12. The method of claim 7, wherein the sending step further comprises:
compiling a server instruction set having a corresponding data payload;
including an identifier for the new hardware component in the data payload; and
sending the server instruction set and the data payload to the update server.

13. The method of claim 12, wherein the server instruction set comprises non-executable operation codes.

14. The method of claim 7, wherein the receiving the response from the update server step further comprises:
receiving a handset instruction set having a sequence of operation codes and a corresponding data payload;
extracting the corresponding data payload, wherein the corresponding data payload comprises the executable device driver;
translating the sequence of operation codes into a set of executable instructions comprising the installation instructions; and
executing the set of executable instructions to install the executable device driver.

15. The method of claim 14, wherein the executing the set of executable instructions step is carried out within a runtime engine operating on the wireless communication device.

16. The method of claim 7, further comprising:
determining that the previous device driver size is greater than the executable device driver size;
copying the previous device driver from the persistent storage to a volatile storage;
deleting the previous device driver from the persistent storage; and
storing the executable device driver for the new hardware component in at least a portion of a location in the persistent storage previously occupied by the previous device driver.

17. The method of claim 16, further comprising the steps of:
testing the executable device driver for the new hardware component to determine its validity;
deleting the previous device driver from the volatile storage if the executable device driver is valid; and
restoring the previous device driver from the volatile storage to its previous location in the persistent storage if the executable device driver is not valid, wherein the previous device driver is used to communicate with the new hardware module.

18. The method of claim 7, further comprising:
determining that the previous device driver size is smaller than the executable device driver size;
allocating a new storage space in the persistent storage, the new storage space sufficient to store the executable device driver for the new hardware component; and
storing the executable device driver for the new hardware component in the new storage space.

19. The method of claim 18, further comprising the steps of:
validating the executable device driver for the new hardware component;
deleting the previous device driver from persistent storage if the executable device driver is valid; and
using the previous device driver to communicate with the new hardware component if the executable device driver is not valid.

20. A method for interchanging a plurality of hardware components on a wireless communication device, comprising the steps of:
providing a data storage area for storing instructions executable by the wireless communication device and for storing a plurality of device drivers corresponding to a plurality of hardware components;
replacing a previous hardware component having a previous device driver of the plurality of device drivers with the new hardware component;
detecting the new hardware component utilizing a modular hardware detector;
querying the new hardware component utilizing the modular hardware detector to obtain profile information from the new hardware component;
providing a runtime engine configured to receive the profile information for the new hardware component from the modular hardware detector and to compile a request to an update server coupled to a wireless communications network for a new device driver for the new hardware component, the request having a data payload comprising at least a portion of the profile information;
receiving a response from the update server via the wireless communication network, wherein the response comprises an executable device driver for the new hardware component; and
storing the executable device driver in the data storage area.

* * * * *